Aug. 28, 1923.
R. DEMING
TRACTOR HITCH
Filed Aug. 20, 1921
1,466,274
2 Sheets-Sheet 1
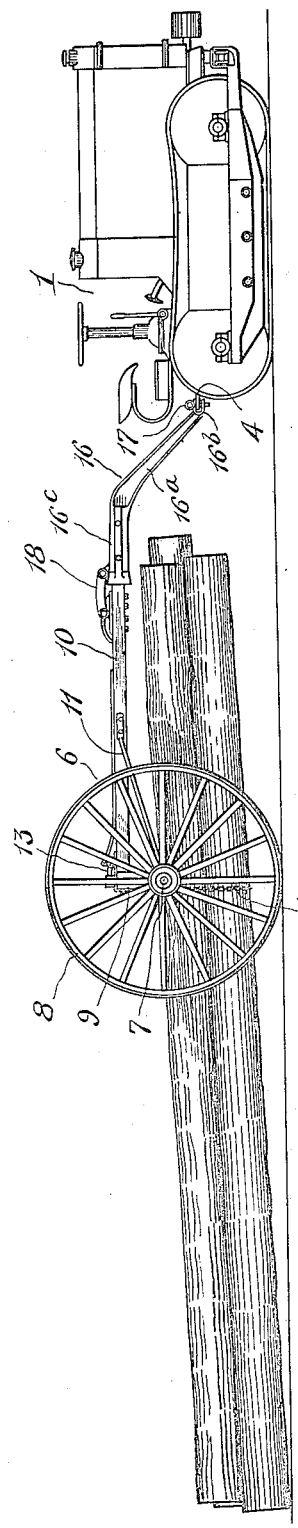
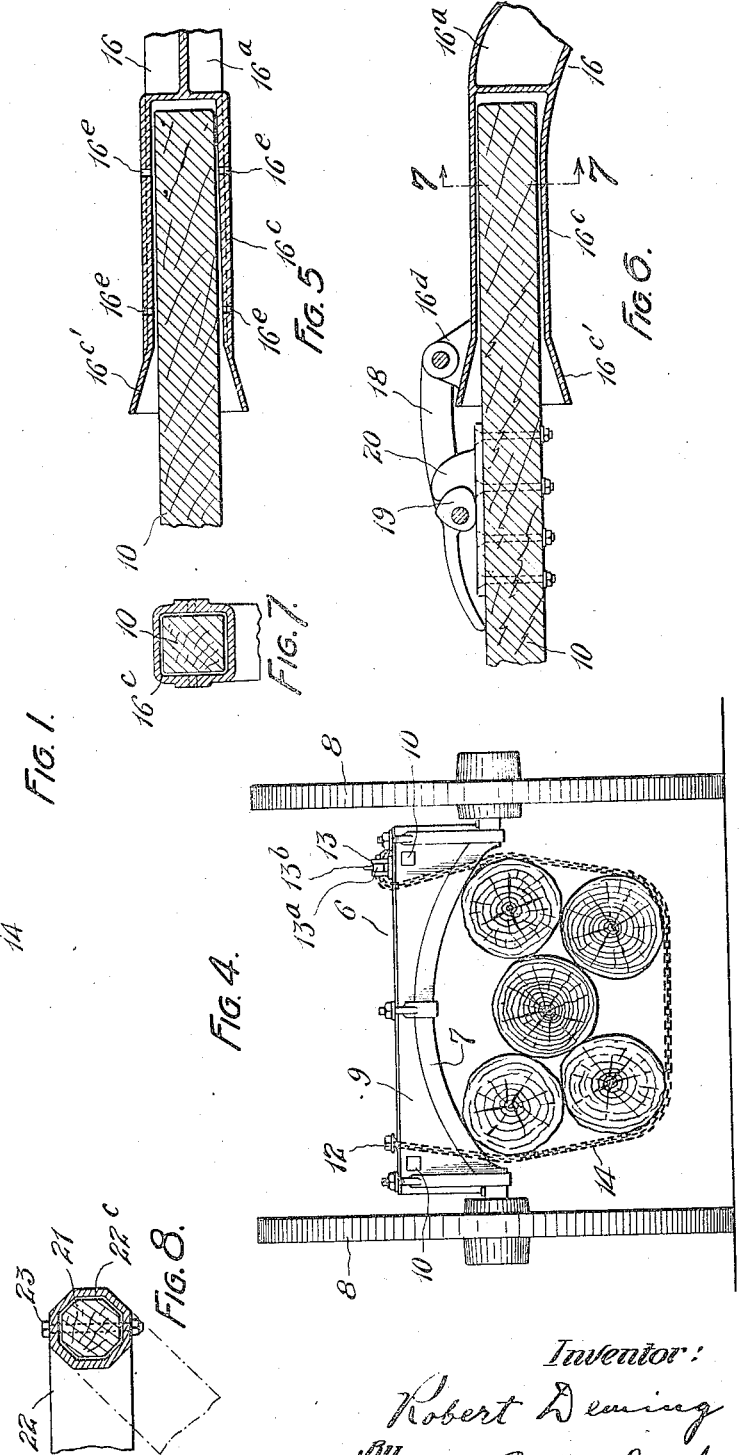
Inventor:
Robert Deming
By Ray S. Fehr
Attorney.

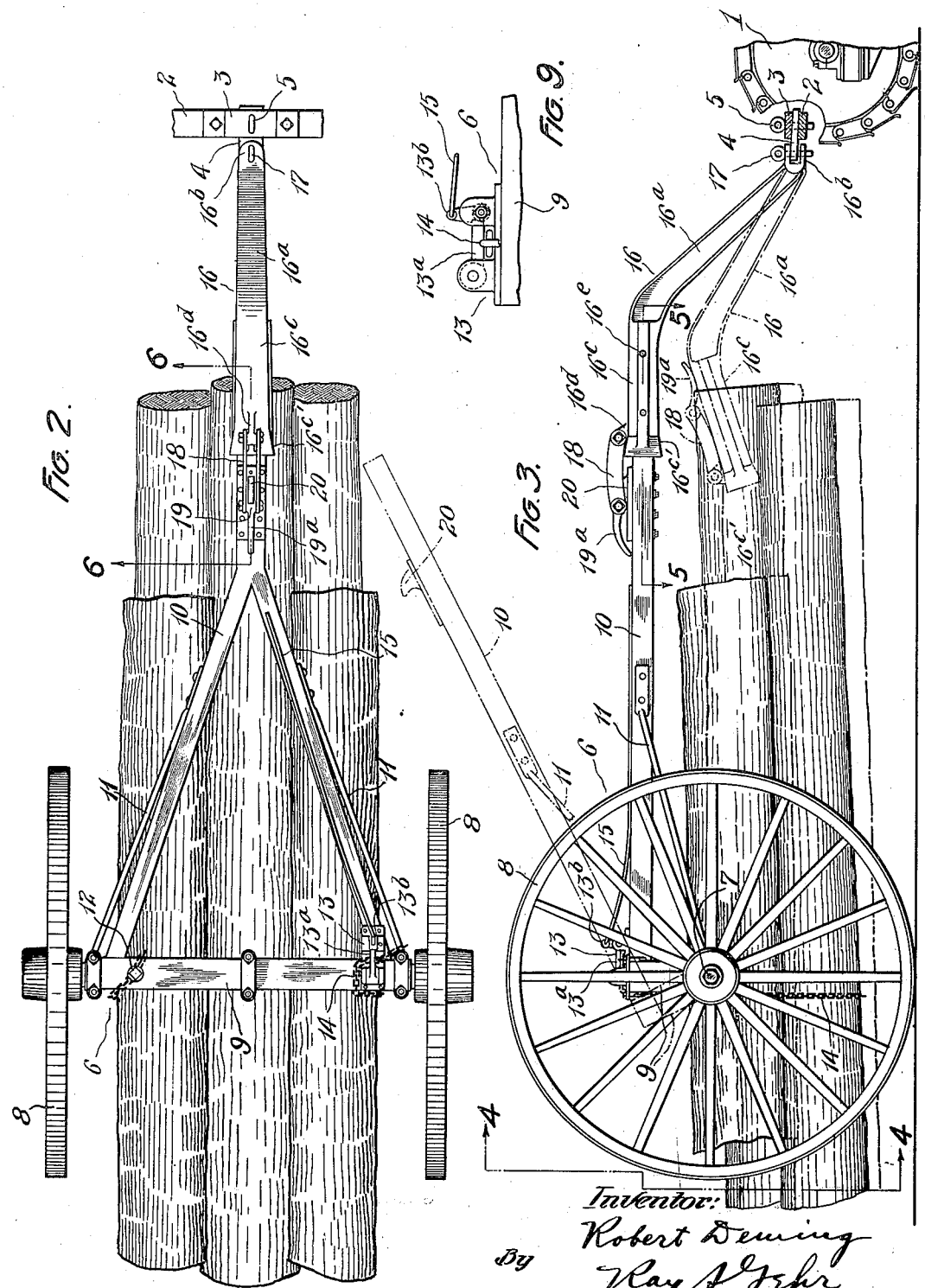

Patented Aug. 28, 1923.

1,466,274

UNITED STATES PATENT OFFICE.

ROBERT DEMING, OF CLEVELAND, OHIO.

TRACTOR HITCH.

Application filed August 20, 1921. Serial No. 493,963.

*To all whom it may concern:*

Be it known that I, ROBERT DEMING, a citizen of the United States, residing at Cleveland, in the county of Cuyahoga and State of Ohio, have invented certain new and useful Improvements in and Relating to Tractor Hitches, of which the following is a specification, reference being had therein to the accompanying drawings.

The invention relates to means for effecting the hitch or coupling between a tractor and the load drawn by it.

One of the main objects of the invention is to provide a hitch especially adapted for use in cases where the hitch must be coupled to the load at a point offset vertically or laterally or both vertically and laterally, from its point of connection to the tractor.

Another object of the invention is to provide a hitch possessing the requisite flexibility to meet practically any working condition, at the same time, enabling the tractor and the load to be backed when desired.

Another object of the invention is to provide a hitch adapted to suitably apply the draft of the tractor to practically any type of trailing load, especially to two-wheeled trucks or machines as well as four-wheeled vehicles or machines.

A further object of the invention is to provide coupling means which is connected with the tractor in such a manner that, while affording the desired flexibility as above referred to, yet when disconnected from the load, is supported by the tractor off the ground so as not to interfere with the movement of the tractor either forward or backward.

Another object of the invention is the provision of a tractor hitch having the characteristics above indicated and which is of simple construction and of light weight in proportion to its strength and which in use can be easily connected and disconnected, especially in the case of its connection with the load.

Various other objects, more or less ancillary or incidental to the foregoing, will be apparent from the following description in which is set forth in connection with the accompanying drawings one of the various possible applications of the invention.

In the drawings, Figure 1 is a side elevation showing a tractor of the endless belt type coupled by means of my improved hitch to a two-wheeled log truck or "carry-log."

Fig. 2 is an enlarged plan view of some of the parts shown in Fig. 1.

Fig. 3 is an enlarged side elevation corresponding to Fig. 2.

Fig. 4 is a transverse section on the line 4—4, Fig. 3.

Fig. 5 is a horizontal section on the line 5—5, Fig. 3.

Fig. 6 is a vertical section on the line 6—6, Fig. 2.

Fig. 7 is a section on the line 7—7, Fig. 6.

Fig. 8 is a section corresponding to that of Fig. 7 but showing a modified form of construction.

Fig. 9 is a fragmentary enlarged side elevation of a detail of the "carry-log."

Referring now in detail to the construction illustrated, the numeral 1 designates the tractor in its entirety. I have shown a tractor of the endless belt type, but inasmuch as the invention is applicable to any type of tractor, the one illustrated need not be described further than to state that it comprises a transverse bar 2 rigidly attached to the tractor frame and suitably disposed at the rear end of the tractor. A second bar 3 is mounted on the bar 2 and spaced from it so as to receive between the bars a link 4 which is apertured at its front end to receive a coupling pin 5 which can be inserted through any one of a series of apertures in the bars 2 and 3.

In the construction illustrated, the trailing load to be hitched or coupled to the tractor is a two-wheeled log truck designated in its entirety by the numeral 6. A log truck of this character is known as a "carry-log". The carry-log comprises a rigid axle 7 on which are mounted high ground wheels 8. The axle 7 carries a bolster block 9 to the upper, outside corners of which is attached the customary forked reach rod or tongue 10. Suitable brace rods 11 are provided between the lower part of the bolster structure and the forward part of the tongue. On top of the bolster block and near the ends thereof are log chain holders 12 and 13. The holder 12 is in the form of a bolt passing through the end link of the chain and thus securing the latter to the axle. The holder 13 comprises a pivoted bar 13ª and a pivoted catch 13ᵇ which is arranged to engage the end of the bar 13ª and hold it in the horizontal position shown in Fig. 9 so as to secure the log chain 14 against endwise movement. A chain or cord 15, attached to the catch 13b, can be pulled to disengage the catch and release the chain.

Carry-logs constructed as above described, with the exception of the holder 13, have been in use prior to my invention but heretofore they have been used in connection with a second two-wheeled truck substantially of the character of the front truck of an ordinary horse-drawn wagon, the tongue or reach rod 10 of the carry-log being pivotally connected at its front end to the bolster of the front truck in the well known manner. As distinguished from this prior practice, my invention provides a hitch by means of which the tongue of the carry-log is coupled to a tractor without the use of the front truck above referred to. In the form illustrated, my hitch comprises a main elongated member 16, preferably in the form of a casting, and having a middle part 16a with I-cross-section, a forked front end 16b and a rear end 16c with a hollow square cross-section. The front forked end 16b of the hitch member is adapted to loosely embrace any suitable draw bar member of the tractor. In the construction illustrated the said forked end is coupled to the short link 4 but obviously it can if desired be coupled to a bar rigid with the tractor frame. A coupling pin 17, which passes through apertures in the forked end 16b and the link 4, secures the hitch member 16 to the link with freedom to swing both laterally and, to a limited extent, vertically. The tubular rear end 16c of the hitch member is adapted to pass over the front end of the tongue 10 of the carry-log in telescoping fashion as indicated by Figs. 5 and 6. The front end of the tongue 10 and the socket in the end 16c of the hitch are made square in cross-section (see Fig. 7) for a purpose which will presently appear. At its rear end, the section 16c has flared walls 16c' to facilitate the entry of the tongue into the hitch member. When the tongue and hitch member are assembled in this telescoping fashion, a substantially inflexible connection is made between them. To hold the hitch member and tongue in operative relation, the former is provided with a swinging link 18 in the form of a pair of bars which are pivotally connected at one end to the lug 16d and carry at their opposite end a catch 19 which is adapted to engage the shoulder formed by a hook-shaped upstanding lug 20, secured to the tongue 10. The catch 19 is provided with a handle 19a by which it can be caused to swing the link and catch into and out of operative engagement with the lug 20. The form of the catch 19 is such that its engagement with the hook 20 is maintained by the draft, the point of engagement between the catch and hook being above the line of draft of the link 18. On opposite sides, the box section 16c of the hitch member is formed with aligning apertures 16e, adapted to receive through bolts (not shown) so that the hitch member 16 can, if desired, be more or less permanently attached to the tongue.

It will be observed that the hitch member 16 is bent intermediate its ends with the end parts 16b and 16c horizontally disposed and the intermediate part 16a inclining upwardly and rearwardly. In this way, the relatively low hitch connection of the tractor is accommodated to the high structure of the carry-log.

The advantages attaching to my improved hitch will be readily apparent from a consideration of its use in connection with the carry-log. In accordance with the usual procedure in using the carry-log, the logs to constitute the load are dragged or rolled into a pile and the carry-log is then run astride the pile. Then a slender iron rod formed at one end with a handle and at its other end with a small hook is thrust transversely between the logs and the ground and the loose end of the chain 14 is connected to the hooked end of the rod and drawn under the logs, whereupon the tongue 10 of the carry-log is turned backward and upward so as to lower the arched axle and the loose end of the chain 14 is secured to the fastening 13. Then, by means of a rope or chain attached to the upper end of the tongue 10, the latter is forced downward and forward to lift the logs off the ground. This is readily accomplished by hitching the last-mentioned chain to the tractor. When the tongue has been lowered to a substantially horizontal position, the leverage with respect to the suspended load is so great that it is readily held or balanced in such position. The tractor is then backed up to the carry-log and the hitch device has its tubular rear end slipped over the end of the tongue 10 and the coupling is completed by swinging the link 18 downward into the position shown in Figs. 3 and 6 with the catch 19 in operative engagement with the lug 20.

The coupling between the tractor and the carry-log thus effected enables the tractor to direct the load under practically any sort of ground conditions, turning and backing when required with entire freedom. In turning, the draft of the tractor tends to turn the hitch 16 around the longitudinal axis of the tongue 10 but this is effectively prevented by the squared formation of the tongue end and the socket of the hitch. It will be observed that the hitch affords flexibility at points relatively near the axle of the driving wheels of the tractor, so that as the tractor rides over irregular surfaces which have not yet been encountered by the trailing load, the tongue of the carry-log is not subjected to wide vertical movement, which obviously would be undesirable. At the same time, the inflexible connection between the main hitch member and the tongue of the carry-log holds the latter effectively in its proper position. When it becomes desirable or necessary to back the tractor and trailer, the necessary thrust is readily transmitted from the tractor through the hitch to the tongue.

When the unloading point is reached, the logs are dropped in the desired position by simply pulling the chain or cord 15 which releases one end of the log chain 14. This is readily done by the tractor operator without leaving his seat.

In some cases, it may be desirable to keep the hitch member 16 attached to the trailer, disconnecting it from the tractor when desired by pulling the coupling pin 17, but in other cases and probably more frequently, it would be more convenient to keep the hitch member coupled to the tractor and disconnected from the trailer. In this latter case, the hitch member is supported well off the ground, as indicated by dotted lines in Fig. 3, so that it does not interfere with the backing of the tractor. As has been pointed out above, the hitch member 16 can if desired be more or less permanently bolted to the tongue 10.

The hitch as above described has its front and rear ends offset vertically from each other but in some cases said ends may be offset laterally or both laterally and vertically. For example, in Fig. 8, I have shown a modified construction in which the hitch 22 has the tubular section 22ᶜ at its rear end octagonal in cross-section and the truck or machine to be towed has the end of its tongue 21 correspondingly formed to fit the octagonal socket of the hitch. The tongue is provided with vertical holes to receive coupling bolts, one of which is shown at 23, and the hitch is formed with bolt holes arranged to permit the hitch to be mounted and secured on the tongue in any one of eight different angular positions. In Fig. 8 the hitch is shown in one of the possible positions by the full lines and in another of said positions by the broken lines.

To those familiar with the use of tractors for hauling various forms of trailing loads, it will be obvious that my improved hitch can be used advantageously for hauling various forms of trailers including trucks, road scrapers, farm implements, such as harvesters and seeding machines, etc. The hitch is obviously advantageous where it is desirable or necessary to make connection with the trailer at points vertically or laterally offset from the point of connection with the tractor, for if the trailer is a four-wheeled truck or machine the hitch, with its inflexible connection with the trailer tongue and flexible connection with the tractor, insures application of the draft to the trailer without the objectionable straining of the front axle and fifth wheel structure of the trailer which would result if the draft were applied on inclined lines; and, in addition to its use with four-wheeled trailers, the hitch has especially notable advantages in connection with two-wheeled trailers such as carry-logs, two-wheeled trucks, and farm implements such as binders or seeding machines, which also are supported on two wheels only, since the hitch can be relied upon to balance such two-wheeled trailers.

Not only is the hitch useful in connection with various forms of loads but it is subject to wide variation structurally and it will be understood that the invention is not limited to the particular form of construction and arrangement above set forth, the scope of the invention being indicated by the appended claims.

What I claim as my invention is:

1. In a hitch for coupling trailers to a tractor, the combination of a rigid elongated member having a rear part and a forward part extending at an angle to the rear part, means adapted to flexibly connect the front end of said member to the tractor frame with freedom for said member to swing laterally and vertically, and readily disengageable means adapted to detachably connect the rear end of the rigid member to the trailer structure substantially inflexibly and so as to prevent the rigid member from turning about an axis extending longitudinally of its rear part.

2. In a hitch for coupling trailers to a tractor, the combination of a rigid elongated member having a rear part and a forward part extending at an angle to the rear part, means adapted to flexibly connect the front end of said member to the tractor frame with freedom for said member to swing laterally and vertically and with slight vertical lost motion, and readily disengageable means for detachably joining the rear end of the rigid member by a non-swivelling telescopic connection to the trailer structure.

3. The combination with a tractor and a two-wheeled trailer having a forwardly extending tongue rigid with its axle structure, of a rigid elongated member having a rear part and a forward part extending at an angle to the rear part, means adapted to flexibly connect the front end of said member to the tractor frame with freedom for said member to swing laterally and vertically and with slight vertical lost motion, and readily disengageable means for detachably joining the rear end of the rigid member by a non-swivelling telescopic connection to the front end of the trailer tongue.

4. In a hitch for coupling trailers to a tractor, the combination of a rigid elongated member having an inclined forward part formed with an I-cross-section and a horizontal rear part formed with an out of round tubular section to telescopically receive a similarly shaped part of the trailer, means on said forward part to flexibly connect it to the frame of the tractor, and a manually operable catch device on said rear part adapted to cooperate with a suitable catch device on the trailer.

5. In a hitch for coupling trailers to a tractor, the combination of a rigid elongated member, means adapted to flexibly connect the front end of said member to the tractor frame with freedom for said member to swing laterally and vertically, the rear end of the rigid member being formed to telescopically engage a part of the trailer structure, and manually operable catch devices for holding the last mentioned parts in telescopic engagement, said devices comprising a link having one end pivotally connected to the top of said rigid member, a catch on the other end of said link, and means on the trailer structure formed with a shoulder adapted to be engaged by the said catch.

In testimony whereof, I hereunto affix my signature.

ROBERT DEMING.